United States Patent [19]

Crews et al.

[11] Patent Number: 5,619,661
[45] Date of Patent: Apr. 8, 1997

[54] DYNAMIC ARBITRATION SYSTEM AND METHOD

[75] Inventors: Michael R. Crews, Phoenix; Nicholas J. Richardson, Tempe, both of Ariz.

[73] Assignee: VLSI Technology, Inc., San Jose, Calif.

[21] Appl. No.: 486,401

[22] Filed: Jun. 5, 1995

[51] Int. Cl.⁶ .................................................. G06F 13/14
[52] U.S. Cl. ........................................... 395/299; 395/308
[58] Field of Search ..................................... 395/293, 296, 395/303, 306, 308, 309, 287, 299

[56] References Cited

U.S. PATENT DOCUMENTS

| | | | |
|---|---|---|---|
| 5,396,602 | 3/1995 | Amini et al. | 395/293 |
| 5,517,650 | 5/1996 | Bland et al. | 395/750 |
| 5,546,546 | 8/1996 | Bell et al. | 395/292 |

*Primary Examiner*—Jack B. Harvey
*Assistant Examiner*—Glenn A. Auve
*Attorney, Agent, or Firm*—LaValle D. Ptak

[57] ABSTRACT

A dynamic arbitration system for controlling the data transfer between primary and secondary buses in a personal computer has master and target components on both buses. Primary and secondary bus arbiters are included in a bridge circuit, and initially operate independently of one another in a concurrent arbitration mode of operation. This avoids primary bus interruption for secondary-to-secondary transfers and optimizes the primary bus bandwidth. Whenever a secondary-to-primary bus data transfer cycle is detected, the bridge circuit switches the primary and secondary bus arbiters to an interlocked mode of operation. The interlocked arbitration mode of operation is maintained until the next secondary-to-secondary cycle is detected; whereupon the bridge circuit causes the primary and secondary bus arbiters to be switched back to the concurrent arbitration mode of operation.

8 Claims, 1 Drawing Sheet

DYNAMIC ARBITRATION SYSTEM AND METHOD

BACKGROUND

In personal computer systems (PCs), data continuously is transferred on buses between various master elements to various target elements. Such systems usually include a pair of buses, a primary bus and a secondary bus. The primary bus typically is used by the central processing unit (CPU) of the computer for transferring data to and receiving data from targets such as memories and the like connected to the bus. The secondary bus also has master and target elements connected to it, such as various disk drives and the like.

For some systems, demands made by particular masters or for particular types of information are given a priority over requests for data transfer from other sources; and an arbiter or arbitration circuit functions to grant use of the bus in accordance with the particular configuration of the arbiter control. Use of the bus in such a case typically is provided on a cycle-by-cycle basis to optimize the utilization of the bus and most effectively utilize the operating characteristics of the CPU. Interchange of data between master and targets on such a bus may be accomplished, either in a fixed request priority system or in a rotating priority mode, or in any desired priority mode determined to be the most effective for the system employed.

The performance of the secondary input/output (I/O) buses in PC systems is increasing. As a consequence, the method of data transfer between the primary bus and a secondary bus becomes more critical. Modern PC systems support multiple master elements on both the primary and secondary buses. As a consequence, a central arbitration mechanism or circuit is required for each bus. Data frequently is transferred between a master and a target on the same bus, either the primary bus or the secondary bus. When transfers of data occur between the two buses, however, currently two different arbitration methods are employed.

The first arbitration method, currently used for transferring data between primary and secondary buses in PC system, is known as "interlocked arbitration". Interlocked arbitration systems require that the secondary bus arbiter gains mastership of the primary bus by way of the primary bus arbiter prior to granting use of the secondary bus to one of its master elements. When this system is used, it favors secondary-to-primary transfer cycles, saving time in one of two ways. Interlocked arbitration ensures that the primary bus is available if the transfer is a secondary-to-primary transfer, rather than a secondary-to-secondary transfer. In addition, interlocked arbitration ensures that the secondary bus is available if the primary transfer is a primary-to-secondary transfer. This prevents the need to consume time resolving deadlock conditions which arise if a primary-to-secondary and secondary-to-primary cycle were to be permitted to occur simultaneously.

In an interlocked system, time also is saved, once the bus is acquired, since primary bus mastership is maintained by any secondary master request through multiple secondary-to-primary cycles, thus eliminating primary bus arbitration between every cycle. Since most PC peripheral data is transferred in large blocks over many cycles, the time saved through the elimination of primary bus arbitration between every cycle can be significant. This time saving for secondary-to-primary cycles, however, is realized at a cost to primary bus bandwidth for two reasons. The interlocked arbitration system and method holds the primary bus mastership, even for secondary-to-secondary transfers. Clearly, secondary-to-secondary transfers do not involve the primary bus; and holding the primary bus for such transfers deprives use of the primary bus for any primary-to-primary transfers which may be requested during this time. In addition, primary bus mastership is held while communication with the secondary master occurs to begin the cycle.

A second method of arbitration used to control data transfer between primary and secondary buses is called concurrent arbitration. Concurrent arbitration operates the primary bus arbiter and the secondary bus arbiter independently. As a result, concurrent arbitration favors primary bus bandwidth by saving primary bus cycles in two ways. Unlike interlocked arbitration systems, the secondary arbiter in a concurrent arbitration system does not attempt to gain mastership of the primary bus prior to granting secondary mastership to one of its requesting elements. Primary bus mastership only is requested after the secondary master cycle has begun and the address identifies a target element on the primary bus. This eliminates holding of the primary bus during secondary-to-secondary transfers. In addition, the primary bus is not held during communication between the secondary arbiter and its requesting master to begin the master cycle. The disadvantage of this system, however, is that the increased primary bus bandwidth comes at a cost to secondary-to-primary transfer performance, since primary bus arbitration is required between each and every secondary master cycle. This is contrasted with interlocked arbitration, where multiple cycles are maintained for transferring large blocks of data. In addition, concurrent arbitration deadlock conditions can occur when a primary-to-secondary cycle and a secondary-to-primary cycle are pending simultaneously. In such cases, one of the cycles, in accordance with a preset deadlock operating sequence, must be backed off for a subsequent retry. This consumes time, which degrades the performance characteristics of the computer.

Accordingly, it is desirable to provide an arbitration system and method which overcomes the disadvantages of the prior art mentioned above, and which optimizes the advantages of both interlocked arbitration and concurrent arbitration systems.

SUMMARY OF THE INVENTION

It is an object of this invention to provide an improved arbitration system for computers.

It is an additional object of this invention to provide an improved arbitration system and method for personal computers.

It is another object of this invention to provide an improved dynamic arbitration system and method for personal computers.

It is a further object of this invention to provide a dynamic arbitration system and method for controlling the transfer of data between primary and secondary buses in a personal computer.

In accordance with a preferred embodiment of the invention, a bus arbitration system for controlling the transfer of data between primary and secondary buses of a personal computer includes a bridge controller having primary and secondary arbiters or arbitration circuit members in it. Detection logic is provided in the bridge controller to respond to data transfer requests from the primary bus and from the secondary bus. The primary and secondary arbitration circuit members normally function independently (concurrent arbitration), and the detection logic causes the primary and secondary arbitration circuit members to switch to interlocked arbitration operation in response to secondary-to-primary bus data transfer requests.

DETAILED DESCRIPTION

Figure 1:
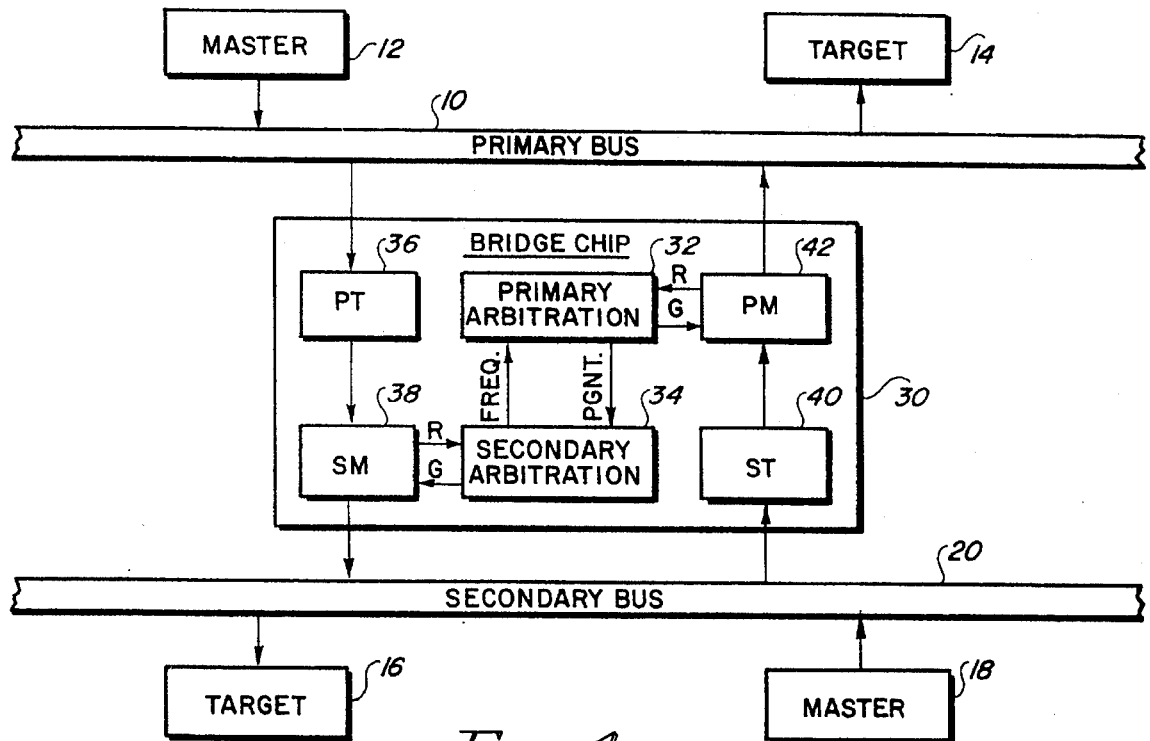
FIG. 1 is a block diagram of a preferred embodiment of the invention.

Reference now should be made to the drawings, in which FIG. 1 is a block diagram representation of a dynamic arbitration system in accordance with a preferred embodiment of the invention. FIG. 1 shows a typical personal computer (PC) architecture including a primary bus 10 and a secondary bus 20. As shown in FIG. 1, the primary bus 10 has a master circuit device 12 and a target circuit device 14 connected to it. As is well known, however, more than one master device and more than one target device may be connected to the bus 10. Only a single master 12 and a single target 14 are shown in FIG. 1 for purposes of simplifying the system representation. The system operates in the same manner, irrespective of the number of master and target devices which are connected to the primary bus 10.

The secondary bus 20 similarly is shown with a single master device 18 and a single target device 16 connected to it. As with the primary bus 10, the secondary bus 20 may have multiple master devices and multiple target devices connected to it operating to transfer data between themselves on the same bus, or to transfer data between a master on one bus and a target on the other bus.

The primary bus 10 and the secondary bus 20 are interconnected through a bridge circuit 30, which controls both the transfer of data between the two buses as well as data transfers which occur completely on one or the other of the two buses 10 and 20. To effect dynamic arbitration in accordance with a preferred embodiment of the invention, the bridge 30 includes a primary arbitration circuit or primary arbiter 32 and a secondary arbitration circuit or secondary arbiter 34. Also, operating in conjunction with the primary bus 10 and the primary arbiter 32, is a primary target (PT) 36 in the bridge 30, which is connected to a secondary master (SM) 38 as well as to the primary arbiter 32. Similarly, a secondary target (ST) 40 is connected from the secondary bus 20 to a primary master (PM) 42 and to the secondary arbiter 34. It should be noted that, operating in conjunction with the portion of the system which is shown in FIG. 1, standard clock signals, write and read buffer circuits and output FIFO and input FIFO circuits (not shown) also are present. These circuits are standard in bridge systems (not a part of arbitration) and have not been shown to avoid unnecessary cluttering of the drawing.

In the system of FIG. 1, when operation initially commences, the system is controlled by a bridge chip 30 to cause the primary arbiter 32 and the secondary arbiter 34 to work independently in a concurrent mode of arbitration. This avoids primary bus interruption for any secondary-to-secondary transfers and optimizes the primary bus bandwidth, as described above in conjunction with the operation of a conventional concurrent arbitration system. With the system operated in this manner, when a request, for example, is made by the master device 12 on the primary bus 10 for a target 14 on the same primary bus, the signal request for that cycle is supplied from the bus 10 to the primary arbiter 32. When the primary arbiter 32 considers the master 12 to have the highest priority, the arbiter 32 asserts a grant line to the master device 12. The master device 12 then uses the primary bus 10 to transfer data directly to the target 14. Thus, a primary-to-primary transfer is effected without involving in any way the secondary bus 20 or the secondary arbiter 34.

Similarly, if a request is made from the master device 18 on the secondary bus 20 for a target 16, also connected to the secondary bus 20, the request is supplied from the master 18 to the secondary arbiter 34. When the secondary arbiter 34 considers the master device 18 to have the highest priority, the arbiter 34 asserts a grant line to the secondary master 18. The master 18 then uses the secondary bus 20 to transfer data directly to the target 16. This secondary-to-secondary transfer is effected without involving in any way the primary bus 10 or the primary arbiter 32. This is a standard concurrent mode secondary-to-secondary operation.

As long as requests are made solely intra-bus in this manner, the system continues to operate in a concurrent mode of operation. It is readily apparent that requests from a master 12 on the primary bus 10 for any target 14 on that bus have no effect on the data transfer on the secondary bus 20, and vice-versa.

Now consider a situation where, the master device 12 on the primary bus 10 transfers data to a target 16 on the secondary bus 20. Clearly, to do this, the only way to transfer data from the master 12 to a secondary target 16 is to go through the bridge circuit 30. The master device 12 asserts a request line to the primary arbiter 32 in the same manner described above. When the primary arbiter 32 considers the master 12 to have the highest priority, it asserts a grant line to the master 12. The master 12 then transfers data to the primary target (PT) 36 of the bridge 30, which then communicates with a secondary master (SM) 38 of the bridge 30 to transfer the data on the secondary bus 20. Following arbitration between the SM master 38 and the secondary arbiter 34, the SM master 38 transfers data across the secondary bus to the target 16. This permits the primary and secondary buses 10 and 20, respectively, to run at different frequencies or even to use entirely different protocols, since the PT 36 knows the primary bus protocol, while the SM 38 knows the secondary bus protocol.

For the foregoing operation, the concurrent arbitration mode is used. Concurrent arbitration favors intra-bus transfers by not holding the opposite bus for arbitration-interlocking or for actual data transfer until it has been determined that the data of one bus cycle is destined for the opposite bus and that data is waiting at the bridge master element of the opposite bus (SM 38 or PM 42).

Interlocked arbitration favors inter-bus transfers by holding the opposite bus between transfers to prevent time consuming re-arbitration of the opposite bus between each transfer. In addition, interlocked arbitration prevents deadlock conditions, and the need for time consuming deadlock resolution, which arises when concurrently operating primary and secondary bus arbiters allow primary-to-secondary and secondary-to-primary cycles to begin at the same time, thus colliding at the bridge 30.

So long as there are only primary bus cycles operating, the arbitration mode used in the system does not matter. Without secondary bus cycles occurring at the same time as the primary bus cycles, there can be no deadlock conditions or need to re-arbitrate the secondary bus 20. With only primary-to-primary and primary-to-secondary cycles, the secondary bus arbiter 34 simply "parks" its grants on the secondary master (SM) 38, since it is the only secondary master requesting use of the secondary bus. This facilitates both primary-to-primary and primary-to-secondary transfers without secondary arbitration delay, regardless of whether the arbitration scheme is currently interlocked or concurrent.

The arbitration modes become important, however, when a secondary master element, other than the element SM 38 (which is used only to facilitate primary-to-secondary transfers), requests the use of the secondary bus 20 by asserting a request line to the secondary arbiter 34. When this happens, deadlocks and secondary arbitration delays can occur. Therefore, the system in the bridge 30 is required to make a dynamic arbitration decision to choose the most efficient of the two arbitration modes, concurrent or interlocked. If the secondary arbiter 34 detects a secondary-to-secondary transfer, it then remains in the concurrent arbitration mode where it continues to enable all secondary grants independently of primary bus arbitration (without interlocking the primary bus 10).

If, however, a secondary-to-primary bus transfer request is detected, the secondary bus arbiter 34 shifts to the interlocked arbitration mode where further secondary grants, other than the grant for the secondary master (SM) 38, are disabled, until primary bus mastership is obtained from the primary bus arbiter 32. Until primary bus mastership is obtained, the secondary arbiter parks on the SM 38 grant to facilitate any primary-to-secondary transfers. Primary bus mastership is obtained by the secondary bus arbiter by asserting the PREQ (Primary Request) signal. When the primary bus arbiter 32 considers the PREQ signal as the highest priority primary request, it asserts a primary grant (PGNT) indicated to the secondary bus arbiter 34 that it has obtained primary bus mastership. The secondary bus arbiter 34 then enables secondary grants other than the SM grant until PGNT is removed by the primary bus arbiter 32, as an indication that it no longer considers PREQ the highest primary request. When PGNT is removed, the secondary bus arbiter once again disables further secondary bus grants, other than the grant to the SM 38 block, since it has lost the primary bus interlock.

The interlock mode cycle continues with all of the benefits of interlocked arbitration mode until the secondary bus arbiter detects a secondary-to-secondary transfer request, at which time interlocked arbitration no longer is beneficial. Operating on the basis that one secondary-to-secondary transfer will be followed by another, the secondary bus arbiter 34 switches back to the concurrent arbitration mode, where all secondary grants are enabled without regard to primary bus arbitration. This mechanism therefore isolates the dynamic arbitration logic to the secondary arbiter block 34. The primary arbiter block 32 is a conventional priority arbiter with request inputs and grant outputs issued in order of any one of a number of priority schemes.

Figure 2:
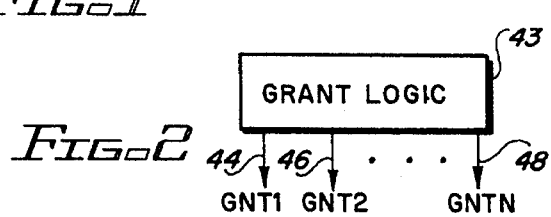
FIG. 2 illustrates a logic block used in the circuit of FIG. 1.

FIG. 2 is a simple block diagram illustration of grant logic 43, which may be employed with either of the arbiters 32 or 34. Typically, the grant logic operates in accordance with a priority request protocol such as fixed priority or rotating priority mode, for example. As requests are received, they are granted in accordance with the protocol and are shown as being provided on a plurality of grant output leads 44, 46 and 48, indicated as GNT 1, GNT 2, and GNT N.

Figure 3:
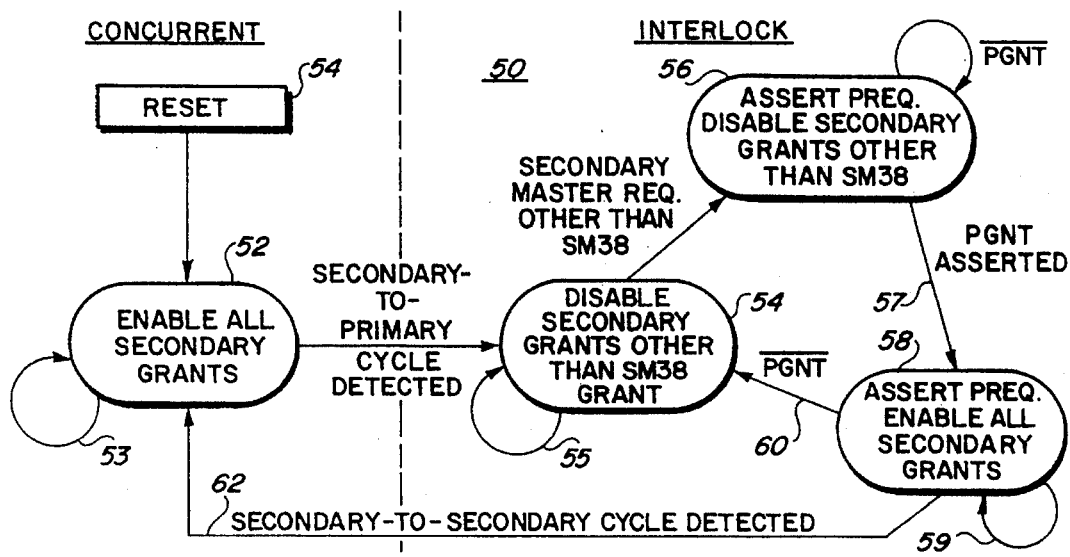
FIG. 3 is a state machine diagram of the operation of the system shown in FIG. 1.

Reference now should be made to FIG. 3, which is a diagram of a dynamic state machine illustrating the manner of operation of secondary-to-primary data transfer requests.

As shown in FIG. 3, the dynamic state machine 50 is indicated as divided into two parts, separated by a dotted vertical line. To the left of the vertical line is the operation of the system in its concurrent arbitration mode. To the right of the dotted line in FIG. 3 is the operation of the state machine when it functions in its interlocked arbitration mode of operation.

As with all state machine diagrams, FIG. 3 is made up of "exit arrows", "loop back arrows", and "state bubbles". Each exit arrow (such as arrows 57, 60 and 62) represents a detected event and points to a "state bubble", which holds a description of the new action to be taken upon detection of that event. Each loop back arrow (such as 53, 55, $\overline{PGNT}$, 59) indicates that the current action continues until the exit arrow event is detected. Therefore, each exit arrow is labeled with an event, while loop back arrows simply indicate that the action continues by virtue of the lack of the exit arrow event from that "state bubble".

As shown in FIG. 3, when the system initially is turned on, a reset signal from a suitable source 54 is applied to the Dynamic Arbiter State Machine (FIG. 3) of the secondary arbiter 34, causing it to enter state 52 ("enable all secondary grants"). In this state, the grant logic block 43 (FIG. 2) of the secondary arbiter 34 is enabled to grant all secondary bus master requests in the order mandated by its priority scheme without regard to primary bus arbitration. This is the concurrent mode of operation, and is maintained, as indicated by the loop back arrow 53, until a secondary-to-primary cycle is detected. Operating under the assumption that one secondary-to-primary cycle will be followed by another, the dynamic arbiter switches to the interlocked mode of operation, which is more efficient for such cycles for the reasons described above.

Interlocked arbitration requires that the secondary arbiter 34 obtains primary bus mastership from the primary arbiter 32 for granting secondary bus mastership to masters other than SM 38. The interlocked arbitration mode is implemented when the dynamic state machine of FIG. 3 transfers from state 52 to state 54 in response to the detection of the first secondary-to-primary cycle event. When this occurs, state 54 of the Dynamic Arbiter State Machine disables further secondary grants other than those from SM 38. The Dynamic Arbiter State Machine remains in state 34, as indicated by the loop back arrow 55, until secondary master requests other than those from SM 38 are detected, at which time the state machine transfers to state 56, as indicated by the exit arrow from state 54 to state 56.

In state 56, the state machine asserts PREQ to the primary bus arbiter 32 (FIG. 1) to request primary bus mastership. The state machine remains in state 56, as indicated by the loop back arrow, until PGNT is asserted by the primary arbiter 32 to indicate that primary bus mastership has been granted or "interlocked". The primary grant may be immediate; or it may take some time, depending upon the activity of other primary master requests on the primary bus 10 (FIG. 1) and the grant priority scheme implemented in the primary arbiter 32. Upon detection of PGNT asserted, the state machine transfers, as indicated by exit arrow 57, to state 58 where all secondary master grants then are enabled from the grant logic block 43 (FIG. 2). In addition, PREQ remains asserted in this state at 58 as long as there are secondary master requests to request the primary bus interlock be held by the primary arbiter.

When the primary arbiter grant priority scheme no longer considers PREQ the highest priority master request, it deasserts PGNT, indicating to the secondary arbiter 34 that the interlock is lost momentarily. In response, the Dynamic Arbiter State Machine of FIG. 3 transfers back to state 54, as indicated by exit arrow 60, where further secondary grants other than SM 38 from the grant logic 43 once again are disabled until primary bus interlock can be obtained in the manner described above.

The state machine of FIG. 3 remains in this interlock loop while granting the secondary bus to a secondary bus master element from state 58 when the state machine detects a secondary-to-secondary cycle. Operating under the assumption that one secondary-to-secondary cycle will be followed by another such cycle, the state machine of FIG. 3 switches back to the concurrent mode of operation, as indicated by exit arrow 62, to state 52. This is done since the concurrent mode of operation is more efficient for such cycles, as described previously. The concurrent arbitration mode is implemented by the state machine when it transfers from interlocked state 58 back to concurrent state 52, upon detection of this first secondary-to-secondary cycle.

The foregoing description of the preferred embodiment of the invention is to be considered as illustrative and not as limiting. Various changes and modifications will occur to those skilled in the art for performing substantially the same function, in substantially the same way, to achieve substantially the same result, without departing from the true scope of the invention as defined in the appended claims.

What is claimed is:

1. A dynamic arbitration system for controlling data transfer between primary and secondary buses in a computer including in combination:

a primary bus having master and target components connected to it;

a secondary bus having master and target components connected to it;

a bridge controller having primary and secondary arbitration circuit members therein; and detection logic in said bridge controller responsive to data transfer requests from said primary bus and from said secondary bus, said detection logic coupled with said primary and secondary arbitration circuit members to cause said primary and secondary arbitration circuit members normally to function independently in a concurrent arbitration mode and to cause said primary and secondary arbitration circuit members to switch to interlock arbitration in response to secondary-to-primary bus data transfer requests; and wherein said detection logic causes said primary and secondary arbitration members to switch back to said concurrent arbitration mode from interlocked arbitration in response to secondary-to secondary bus data transfer requests when said primary and secondary arbitration circuit members are operating in said interlocked arbitration mode.

2. The combination according to claim 1 wherein said computer is a personal computer.

3. A method for effecting dynamic arbitration in the transfer of data between primary and secondary buses in a personal computer including the steps of:

providing primary and secondary bus arbiters, respectively, for said primary and secondary buses;

causing said primary and secondary bus arbiters normally to work independently in a concurrent arbitration mode to avoid primary bus interruption for secondary-to-secondary data transfers;

detecting secondary-to-secondary data transfer requests and secondary-to-primary data transfer requests;

causing said primary and secondary bus arbiters to switch to interlocked arbitration upon detection of secondary-to-primary data transfer requests.

4. The method according to claim 3 further including the step of detecting secondary-to-secondary data transfer requests when said primary and secondary bus arbiters are operating in an interlocked arbitration mode to switch operation of said primary and secondary bus arbiters back to independent concurrent arbitration mode of operation.

5. The method according to claim 4 further including the step of disabling further secondary-to-secondary data transfer requests in response to a secondary-to-primary transfer request.

6. The method according to claim 5 further including the step of disabling primary-to-primary data transfer requests whenever said first and second bus arbiters are operated in said interlocked arbitration mode of operation.

7. The method according to claim 3 further including the step of disabling further secondary-to-secondary data transfer requests in response to a secondary-to-primary transfer request.

8. The method according to claim 3 further including the step of disabling primary-to-primary data transfer requests whenever said first and second bus arbiters are operated in said interlocked arbitration mode of operation.

* * * * *